(12) United States Patent
Noel

(10) Patent No.: US 8,452,233 B2
(45) Date of Patent: May 28, 2013

(54) SYSTEM FOR SIGNAL TRANSMISSION BY MAGNETIC INDUCTION IN A NEAR-FIELD PROPAGATION MODE, WITH ANTENNA TUNING FOR LINK BUDGET OPTIMIZATION

(75) Inventor: Denis Noel, Grez-Doiceau (BE)

(73) Assignee: NXP B.V., Eindhoven (NL)

( * ) Notice: Subject to any disclaimer, the term of this patent is extended or adjusted under 35 U.S.C. 154(b) by 1053 days.

(21) Appl. No.: 12/299,548

(22) PCT Filed: May 2, 2007

(86) PCT No.: PCT/IB2007/051632
§ 371 (c)(1),
(2), (4) Date: Nov. 13, 2008

(87) PCT Pub. No.: WO2007/129260
PCT Pub. Date: Nov. 15, 2007

(65) Prior Publication Data
US 2009/0203314 A1    Aug. 13, 2009

(30) Foreign Application Priority Data
May 4, 2006   (EP) ..................................... 06300441

(51) Int. Cl.
*H04B 5/00*    (2006.01)
(52) U.S. Cl.
USPC ...... 455/41.1; 340/10.1; 340/505; 340/12.38; 381/312; 320/108
(58) Field of Classification Search
USPC ........... 455/41.1, 41.2, 78; 194/207; 333/167, 333/174; 340/10.33, 539, 825.31, 825.69, 340/10.34; 375/316, 132; 370/295, 352, 395.4; 307/10.2
See application file for complete search history.

(56) References Cited

U.S. PATENT DOCUMENTS

| | | | |
|---|---|---|---|
| 4,532,932 A | | 8/1985 | Batty, Jr. |
| 6,104,707 A * | | 8/2000 | Abraham ...................... 370/295 |
| 6,275,143 B1 * | | 8/2001 | Stobbe ....................... 340/10.34 |
| 6,307,468 B1 * | | 10/2001 | Ward, Jr. ...................... 340/505 |
| 6,323,566 B1 * | | 11/2001 | Meier .......................... 307/10.2 |
| 6,407,987 B1 * | | 6/2002 | Abraham ...................... 370/295 |
| 6,731,198 B1 * | | 5/2004 | Stobbe et al. .............. 340/10.33 |
| 6,940,358 B1 | | 9/2005 | Meacham |
| 7,152,804 B1 * | | 12/2006 | MacKenzie et al. .......... 235/492 |

(Continued)

FOREIGN PATENT DOCUMENTS

| DE | 19718423 A1 | 11/1998 |
|---|---|---|
| GB | 2326769 A | 12/1998 |
| WO | 9715125 A1 | 4/1997 |
| WO | 0028664 A2 | 5/2000 |

*Primary Examiner* — April G Gonzales

(57) ABSTRACT

A signal transmission system (STS) comprises a transmitter (T) with a first LC circuit comprising a first coil (C1) intended to be fed with signals having a chosen carrier frequency, and a receiver (R) with a second LC circuit comprising a second coil (C2) and coupled to a circuit front-end (FE). The first coil (C1) is arranged to transfer energy to the second coil (C2) by magnetic induction in a near-field propagation mode. The first LC circuit (C1) has an increased quality factor and is tuned to a first frequency which is shifted in a first direction from the carrier frequency by a first value, and the second LC circuit (C2) has an increased quality factor and is tuned to a second frequency which is shifted in a second direction, opposite to the first one, from the carrier frequency by a second value.

15 Claims, 1 Drawing Sheet

U.S. PATENT DOCUMENTS

| | | | |
|---|---|---|---|
| 7,218,359 B2 * | 5/2007 | Peng et al. | 348/731 |
| 7,446,631 B2 * | 11/2008 | Kamata et al. | 333/167 |
| 7,512,383 B2 * | 3/2009 | Essabar et al. | 455/78 |
| 2001/0030988 A1 * | 10/2001 | Fry | 375/132 |
| 2002/0053973 A1 * | 5/2002 | Ward, Jr. | 340/506 |
| 2005/0024198 A1 * | 2/2005 | Ward, Jr. | 340/505 |
| 2005/0063488 A1 * | 3/2005 | Troyk et al. | 375/316 |
| 2005/0111681 A1 * | 5/2005 | Essabar | 381/315 |
| 2005/0111682 A1 * | 5/2005 | Essabar et al. | 381/315 |
| 2005/0150740 A1 * | 7/2005 | Finkenzeller et al. | 194/207 |
| 2009/0001930 A1 * | 1/2009 | Pohjonen | 320/108 |

* cited by examiner

SYSTEM FOR SIGNAL TRANSMISSION BY MAGNETIC INDUCTION IN A NEAR-FIELD PROPAGATION MODE, WITH ANTENNA TUNING FOR LINK BUDGET OPTIMIZATION

FIELD OF THE INVENTION

The present invention relates to systems intended for signal transmission by magnetic induction in near-field propagation mode.

One means here by "signal transmission system" a system comprising a transmitter with a circuit driver intended to be fed with signals having a chosen carrier frequency and feeding a first transmitting antenna coil, and a distant receiver with a second receiving antenna coil coupled to a circuit front-end, the first coil being arranged to transfer energy to the second coil by magnetic induction in a near-field propagation mode.

BACKGROUND OF THE INVENTION

As it is known to those skilled in the art, magnetic induction is one of the technologies used to transmit signals between a transmitter and a receiver, which are parts of some wireless communication equipments, for instance.

The magnetic induction is based on the generation of a quasi-static magnetic field component by a first coil of a transmitter, through which is flowing a variable (sinusoidal) current representative of information to be transmitted. When a second coil of a distant receiver intercepts this generated magnetic field, a modulated current representative of the transmitted signals is induced into its winding.

The magnetic field generated by a current loop (or loop antenna) can be divided into three basic terms: one radiation term proportional to $r^{-1}$ (where r is the distance from the current loop), which represents the flow of energy away from coil, one term proportional to $r^{-2}$, and finally one quasi-stationary term proportional to $r^{-1}$.

When the distance between the transmitter and the receiver is small, i.e. when it is smaller than $\lambda/2\pi$ (where $\lambda$ is the wavelength corresponding to the signal frequency), the field propagation is called "near-field mode". In this mode the quasi-stationary term ($1/r^3$) dominates and is the major contributor. This $1/r^3$ term is independent of frequency, which implies that it can be employed at any frequency in the near-field mode, for given coil and current, to generate a specified magnetic field at the level of the receiver. So, in the near-field mode, the magnetic field properties are essentially determined by the first coil characteristics, and the electric field is much more weaker than the magnetic field.

In the near-field mode, once the system operating carrier frequency and bandwidth are selected, the transmitter and receiver antenna designs can be optimized independently, with their own constraints of power consumption, size and other design considerations.

In most of the signal transmission systems of the art, the first (transmit) coil is put in resonance with a capacitor with which it forms a LC tank (also called "transmitting (TX) LC circuit"). This decreases the amplitude of the current which drives the antenna (driver current) and reach the required coil current. In receive mode, the circuit front-end being a voltage detector, the induced voltage must be maximized. This can be done by putting the second (receive) coil in resonance with a capacitor with which it forms another LC tank (also called "receiving (RX) LC circuit").

The TX LC circuit and the RX LC circuit are both tuned to the operating carrier frequency and have both a low quality factor (Q) to pass the majority of the signals through them.

One can show that this antenna tuning is not optimal in terms of power consumption of the transmitter.

SUMMARY OF THE INVENTION

Therefore, it is an object of the invention to improve on the known art, and to more precisely provide for a signal transmission system having a new antenna tuning allowing a link budget optimization.

For this purpose, it provides a signal transmission system comprising classically a transmitter with a first (TX) LC circuit comprising a first coil and a receiver with a second (RX) LC circuit comprising a second coil and coupled to a circuit front-end, the first coil being arranged to transfer energy to the second coil by magnetic induction in a near-field propagation mode.

This signal transmission system is characterized in that its first LC circuit has an increased quality factor and is tuned to a first frequency which is shifted by a first value, in a first direction, from the operating carrier frequency, and its second LC circuit has also an increased quality factor and is tuned to a second frequency which is shifted by a second value, in a second direction opposite to the first one, from the carrier frequency.

The increase of the quality factor value must be considered in comparison with the low value which is generally used in the art.

The signal transmission system according to the invention may include additional characteristics considered separately or combined, and notably:

- the first value may be equal to the second value;
- the first direction may correspond either to an increase of the carrier frequency or to a decrease thereof;
- for instance, the first and second values may be contained between 10 kHz and 200 kHz, and preferably between 140 kHz and 180 kHz (in fact these values depend on the Q factor considered and the signal modulation used);
- the quality factors of the first and second LC circuits may be approximately doubled;
- the first coil and/or the second coil may be wound around a ferrite core;
- the transmitter may comprise a modulator arranged to feed the first (TX) LC circuit with modulated signals. In this case, the receiver comprises a demodulator arranged to demodulate the signals which are captured by the second (RX) LC circuit; for instance the modulator may be arranged in order to output signals with a FSK or MSK modulation;
- the transmitter may comprise an up-mixer arranged to translate the frequency of the signals intended for feeding the first (TX) LC circuit around the carrier frequency, and the receiver may comprise a down-mixer arranged to translate the carrier frequency of the signals originating from the second (RX) LC circuit down to a lower frequency;
- the receiver may comprise an amplification means arranged to amplify the signals that are detected by the second (RX) LC circuit.

The invention also provides a wireless communication equipment comprising a transmitter and/or a receiver of a signal transmission system such as the one above introduced.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DETAILED DESCRIPTION OF THE INVENTION

Figure 1:
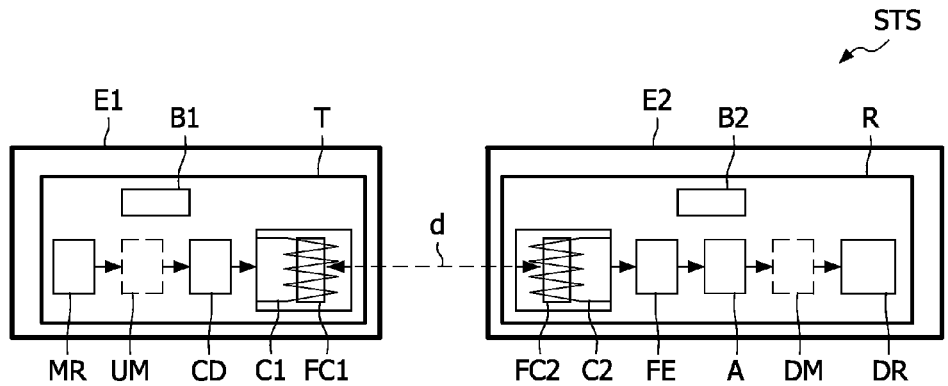
FIG. 1 schematically illustrates an example of signal transmission system according to the invention, FIG. 2 schematically illustrates examples of amplitude responses (in dB) as a function of the frequency (in MHz); S1 being representative of the amplitude response of the antenna tank in a transmitter and a receiver of the art, SC1 being representative of the combination of the transmitted and received amplitude responses S1 in a system of the art, ST2 being representative of the amplitude response of a transmitter LC tank according to the invention, SR2 being representative of the amplitude response of a receiver LC tank according to the invention, and SC2 being representative of the combination of ST2 and SR2 in a system according to the invention.

Reference is initially made to FIG. 1 to describe an example of embodiment of a signal transmission system STS according to the invention.

A signal transmission system STS comprises a transmitter T arranged for transmitting radio signals and a receiver R arranged for receiving the radio signals transmitted by a transmitter T. In the non limiting example illustrated in FIG. 1, the transmitter T equips a first equipment E1 while the receiver R equips a second equipment E2.

In the following description it will be considered that the first E1 and second E2 equipments are bidirectional wireless communication equipments, such as wireless telephones and hearing devices. But it is important to notice that the invention is not limited to this type of wireless communication equipment. It applies to any type of wireless communication equipment, and notably to laptops or personal digital assistants (PDAs), provided with a radio communication module, and to telemetry equipments such as wireless body sensors.

In case where the first E1 and second E2 equipments are bidirectional wireless communication equipments they both comprise a transmitter T and a receiver R, or a transceiver acting as a transmitter T and a receiver R.

As schematically illustrated in FIG. 1, a transmitter T comprises at least a first (TX) LC circuit (or tank), comprising a capacitor (not shown) and a first antenna coil C1 coupled together, and an antenna (or circuit) driver CD coupled to the first LC circuit.

The antenna driver CD receives signals having a chosen operating carrier frequency Fc and excites the first LC (resonant) circuit. According to the invention, the first LC circuit has an increased quality factor Q and is tuned to a first frequency F1 which is shifted in a first direction from the operating carrier frequency Fc by a first value $\delta 1$. So, F1=Fc+/−$\delta 1$. In the preceding relation the first direction is represented by the sign + or −.

For instance, the first value $\delta 1$ is contained between 10 kHz and 200 kHz, and preferably between 140 kHz and 180 kHz. The first value $\delta 1$ depends on the quality factor Q considered and the signal modulation used. For instance, if one uses a FSK modulation the first value $\delta 1$ can be chosen equal to 150 kHz. But it could be also chosen equal to 175 kHz.

One means here by "an increased quality factor" a quality factor (Q) whose value is greater than the Q value of the first LC circuit which is generally used in the art. Preferably the first LC circuit according to the invention is approximately two times greater than the Q value of a LC circuit of the art.

For instance, if the Q value of the art is equal to 22.5, then the Q value of the first LC circuit according to the invention is equal to 45.

Basically, the more increased is the Q factor (compared to a standard situation) the higher the offset $\delta 1$ is. The relation between Q and $\delta 1$ depends on the distribution of spectral components of the modulation.

Figure 2:
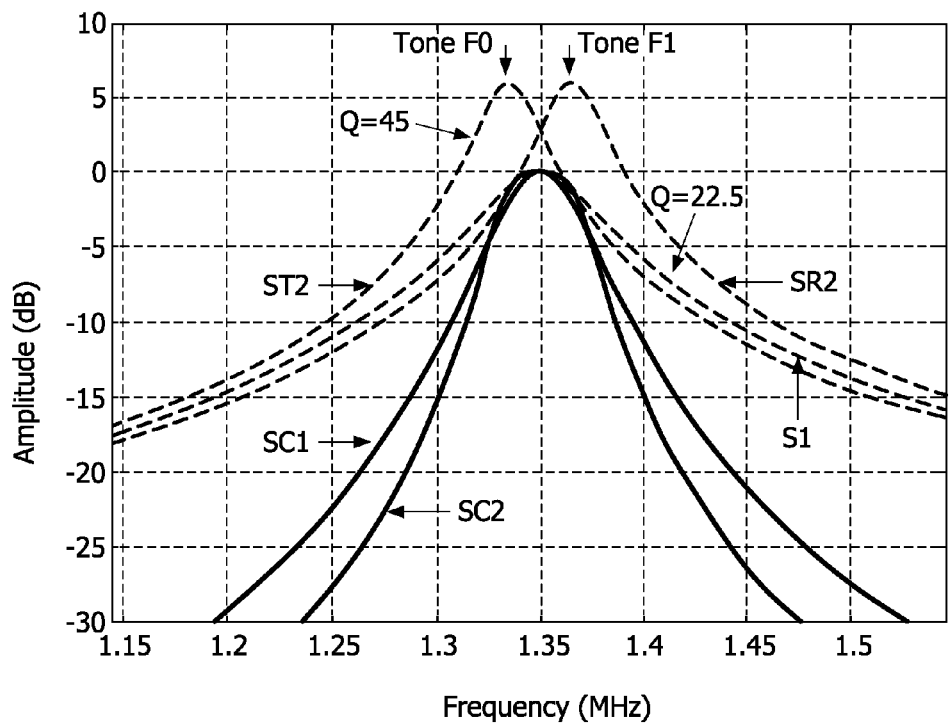

The first coil C1 is fed with the variable current or voltage representative of the signal to transmit. So it generates a quasi-static magnetic field component representative of the signals. The first LC circuit being tuned to F1 which is shifted from Fc, the spectrum generated by the first coil C1 of the transmitter T is asymmetrical (as illustrated in FIG. 2 by the curve ST2).

This first coil C1 may be wound around a ferrite core FC1 in order to increase the total generated magnetic field which is equal to the sum of the magnetic field created by the variable current, and the magnetic field created by the magnetization of the material. Therefore such a ferrite core allows to increase the link efficiency.

In order the signals could be transmitted in a modulated form (i.e. modulated with the information to transmit), the transmitter T may also comprise a modulator MR upward the antenna driver CD, as schematically illustrated in FIG. 1. Such a modulator MR may implement any type of signal modulation scheme and notably a FSK ("Frequency Shift Keying") modulation scheme or a MSK ("Minimum Shift Keying") modulation scheme.

Moreover, when the signals to transmit have a lower carrier frequency than the operating one Fc, the transmitter T may also comprise an up-mixer UM arranged to translate the carrier frequency of these signals around the operating carrier frequency Fc. Such an up-mixer UM, which can be a multiplier, may be located between the modulator MR and the antenna driver CD, as schematically illustrated in FIG. 1.

The distant receiver R comprises at least a second (RX) LC circuit (or tank), comprising a capacitor (not shown) and a second antenna coil C2 coupled together, and a circuit front-end FE coupled to the second LC circuit.

When the loops (or turns or else windings) of the second coil C2 are crossed by the (variable) magnetic field generated by the first coil C1 of a transmitter T, the second coil C2 generates a modulated current, which is representative of this magnetic field and therefore of the transmitted (and possibly modulated) signals with the operating carrier frequency Fc, by magnetic induction.

This second coil C2 may be wound around a ferrite core FC2 in order to increase the current induced by magnetic induction and therefore the link efficiency.

The circuit front-end FE receives the modulated current outputted by the second coil C2 and amplifies and filters it in order to output a filtered modulated current. According to the invention, the second LC circuit has an increased quality factor Q and is tuned to a second frequency F2 which is shifted in a second direction, opposite to the first one, from the operating carrier frequency Fc by a second value $\delta 2$. So, F2=Fc−/+$\delta 2$. In the preceding relation the second direction is represented by the sign − or +. More precisely, if F1=Fc+$\delta 1$ then F2=Fc−$\delta 2$, and if F1=Fc−$\delta 1$ then F2=Fc+$\delta 2$.

For instance, the second value $\delta 2$ may be also contained between 10 kHz and 200 kHz, and more preferably between 140 kHz and 180 kHz. The second value $\delta 2$ depends on the quality factor Q considered and the signal modulation used. Preferably, the second value $\delta 2$ is equal to the first value $\delta 1$. For instance one may choose first $\delta 1$ and second $\delta 2$ values equal to 150 kHz or 175 kHz.

One means also here by "an increased quality factor" a quality factor (Q) whose value is greater than the Q value of a RX LC circuit (or tank) which is generally used in the art.

It is important to notice that there are physical limitations to achieve a high Q factor. In other words the values that can be used for the Q factor according to the invention are rather limited. Higher the Q factor is, better it is in terms of current consumption to drive the first (TX) coil C1 and in terms of induced voltage on the second (RX) LC circuit (or tank) for a defined magnetic field (H) passing through the second (RX) coil C2. But to avoid destroying a modulated signal with a high Q factor (through signal attenuation and distortion), one must shift the first and second tuning frequencies of the first (TX) and second (RX) LC circuits (or tanks), in order the overall transfer function of the TX/RX filters be suited to pass the signal.

For instance, if the Q value of the art is equal to 22.5, then the Q value of the second LC circuit according to the invention is approximately two times greater, i.e. equal to 45.

The second LC circuit being tuned to F2 which is shifted from Fc, its amplification/filtering effect is asymmetrical (as illustrated in FIG. 2 by the curve SR2) and compensates for the asymmetrical spectrum generated by the transmitter T. This is a quasi-full asymmetric compensation when $\delta 1$ is equal to $\delta 2$ (as illustrated in FIG. 2 by the curve SC2).

The filtered modulated current (with the operating carrier frequency Fc), outputted by the second LC circuit, can be amplified by an amplifier A, as schematically illustrated in FIG. 1. Such an amplifier A is preferably a Low Noise Amplifier (LNA). As illustrated, this amplifier A can be located downward the circuit front-end FE (it may be also part of the circuit front-end FE).

When the currents, outputted by the second LC circuit (or the amplifier A which possibly follows the circuit front-end FE), are representative of signals modulated with information to retrieve, the receiver R must comprise a demodulator DR intended for demodulating these currents to retrieve the information they contain. Of course, this demodulator DR implements a demodulation which is of the same type that the modulation implemented by the modulator MR of the transmitter T.

The receiver R may also comprise a down-mixer DM arranged to translate the operating carrier frequency Fc of the currents around a chosen lower carrier frequency. Such a down-mixer DM may be located between the amplifier A (or the second LC circuit when the receiver R does not comprise an amplifier) and the demodulator DR, as schematically illustrated in FIG. 1. When the circuit front-end FE comprises the amplifier A, it may also comprise the down-mixer DM (downward this amplifier A).

At least part of the transmitter T, and notably its modulator MR, up-mixer UM and circuit driver CD may constitute an integrated circuit realized in CMOS technology or in any technology used in chip industry fabrication. Moreover, at least part of the receiver R, and notably its demodulator DR and down-mixer DM and eventually its circuit front-end FE may constitute an integrated circuit realized in CMOS technology or in any technology used in chip industry fabrication.

A comparison of examples of antenna responses (in dB) as a function of frequency (in MHz), in the case of signal transmission systems STS of the art and according to the invention, is illustrated in FIG. 2. In this non limiting example, the signal transmission systems STS operate around an operating carrier frequency Fc equal to 13.5 MHz, and use a FSK modulated signal with a bandwidth of about 600 KHz, a modulation index equal to 1.0 and a modulation rate equal to 300 Kbps, in order to transmit the data (information).

The curve referenced S1 represents antenna tank responses in a transmitter and a receiver of a signal transmission system of the art.

The curve referenced SC1 represents the transfer function of the combination of the transmitter and receiver antenna responses S1 of the signal transmission system of the art.

The curve referenced ST2 represents the frequency response of the antenna tank in a transmitter T of a signal transmission system STS according to the invention.

The curve referenced SR2 represents the frequency response of the antenna tank in a receiver R of the signal transmission system STS according to the invention.

The curve referenced SC2 represents the frequency response of the combination of the transmitter frequency response ST2 and receiver frequency response SR2 in the signal transmission system STS according to the invention.

Because of the frequency shifting and the increased Q factor in the LC circuit driver CD, the equivalent serial resistance of the transmit tank is halved leading to a+3 dB gain in power for a same first coil current (and thus the same magnetic field generation and magnetic induction potential on a remote second coil C2).

Moreover, due to the increased Q factor, the left tone (or tone 0, i.e. Fc−$\delta 1$) or right tone (or tone 1, i.e. Fc+$\delta 1$) of the FSK modulation is amplified in the receiver R in the same way as with the classical signal transmission system of the art, but the right tone is amplified by +6 dB compared to classical signal transmission system.

More, statistically half of the time, the current passing through the first coil C1 is approximately divided by 2.2 (−7 dB), because the right tone is approximately 7 dB below the left one in the transmit spectrum ST2. On the average this leads approximately to 4 dB power reduction. So, there is a gain in power due to the asymmetrical transmit spectrum (+2.2 dB).

Still more, the noise bandwidth of the receiver R is approximately divided by two, but it is compensated by a proportionally equivalent increase of the thermal noise.

Still more, the spectrum is eventually equalized by the transmitting/receiving antenna combination which leads to about same overall transfer function.

So in total a gain of approximately +5.2 dB can be reach.

Preferably, the Eb/No ratio (average energy per bit (b) over noise spectral density (No)) must be increased by 1 dB in order to keep performances identical to the ones of a classical signal transmission system of the art. For instance, to meet a BER (Bit Error Rate) equal to $10^{-3}$, the Eb/No ratio of a classical signal transmission system of the art must be equal to 14.5 dB while it must be equal to 15.5 dB in a signal transmission system STS according to the invention. Actually Eb for tone 0 (denoted $Eb_0$) being higher than Eb ($10 \log_{10}(Eb_0/Eb)$=2.2 dB), the ratio $Eb_0$/No must be equal to 17.7 dB (15.5+2.2).

If the link budget is based on tone 0, with a Q factor equal to 45 and the above mentioned $Eb_0$/No ratio, the required current through the first coil C1 must be approximately equal to 17 mA (rms) to get approximately 47 µV in case where the bandwidth is equal to 300 kHz.

So, with such values the power of the battery B (used into the transmitter T of the invention with an asymmetrical transmitted spectrum), for tone 0, must be approximately equal to 0.93 mW, while it would be equal to 1.78 mW in a classical transmitter with a symmetrical transmitted spectrum. For tone 1 the battery power is generally 2.2 lower than for tone 0, so the average battery power is approximately equal to 0.56 mW.

Therefore due to the invention the total gain in power in the transmitter T is approximately equal to 1.78/0.56≈3.17 (5 dB).

A gain may also be obtained in case where the modulation scheme is more compact than the FSK modulation scheme, and notably in case of a MSK modulation scheme which makes use of the highest Q factor that could be achieved in practice (45).

So, the invention offers several advantages, and notably a significant power reduction and an improved selectivity.

One will notice that the current consumption (on the transmitter side) varies with the type of symbol transmitted, but this can be managed by introducing a bit scrambling.

The invention is not limited to the embodiments of signal transmission system described above, only as examples, but it encompasses all alternative embodiments which may be considered by one skilled in the art within the scope of the claims hereafter.

The invention claimed is:

1. Signal transmission system, comprising
    a transmitter with a first LC circuit comprising a first coil intended to be fed with signals having a chosen carrier frequency, and
    a receiver with a second LC circuit comprising a second coil and coupled to a circuit front-end,
    said first coil being arranged to transfer energy to said second coil by magnetic induction in a near-field propagation mode,
    characterized in that said first LC circuit has an increased quality factor and is tuned to a first center frequency which is shifted in a first direction from said carrier frequency, by a first value, and said second LC circuit has an increased quality factor and is tuned to a second center frequency which is shifted in a second direction, opposite to the first one, from said carrier frequency, by a second value.

2. Signal transmission system according to claim 1, characterized in that said first value is equal to said second value.

3. Signal transmission system according to claim 1, characterized in that said first direction corresponds to an increase of said carrier frequency.

4. Signal transmission system according to claim 1, characterized in that said first direction corresponds to a decrease of said carrier frequency.

5. Signal transmission system according to claim 1, characterized in that said first and second values are contained between 10 kHz and 200 kHz.

6. Signal transmission system according to claim 5, characterized in that said first and second values are contained between 140 kHz and 180 kHz.

7. Signal transmission system according to claim 1, characterized in that said quality factors of said first and second LC circuits are doubled.

8. Signal transmission system according to claim 1, characterized in that said first coil is wound around a ferrite core.

9. Signal transmission system according to claim 1, characterized in that said second coil is wound around a ferrite core.

10. Signal transmission system according to claim 1, characterized in that said transmitter comprises a modulator arranged to feed said first LC circuit with modulated signals, and in that said receiver comprises a demodulator arranged to demodulate the signals captured by said second LC circuit.

11. Signal transmission system according to claim 10, characterized in that said modulator is arranged to output signals with a FSK modulation.

12. Signal transmission system according to claim 10, characterized in that said modulator is arranged to output signals with a MSK modulation.

13. Signal transmission system according to claim 1, characterized in that said transmitter comprises an up-mixer arranged to translate the frequency of the signals intended for feeding said first LC circuit around said carrier frequency, and in that said receiver comprises a down-mixer arranged to translate the carrier frequency of the signals originating from said second LC circuit down to a lower frequency.

14. Signal transmission system according to claim 1, characterized in that said receiver comprises an amplification means arranged to amplify said signals detected by said second LC circuit.

15. Wireless communication equipment, characterized in that it comprises a transmitter and/or a receiver of a signal transmission system according to claim 1.

* * * * *